United States Patent [19]

Serap et al.

[11] Patent Number: 4,695,903

[45] Date of Patent: Sep. 22, 1987

[54] AUDIO VIDEO ENTERTAINMENT MODULE

[75] Inventors: Earl Serap; Deborah Serap, both of Santa Monica, Calif.

[73] Assignee: Deborah Pauline Schuman, Los Angeles, Calif.

[21] Appl. No.: 745,613

[22] Filed: Jun. 17, 1985

[51] Int. Cl.⁴ .............................................. H04N 5/76
[52] U.S. Cl. .................... 358/335; 358/342; 360/55; 360/92; 434/308; 273/DIG. 28
[58] Field of Search .................. 358/335, 342, 310; 360/91, 92, 55, 138; 434/308, 307; 273/DIG. 28

[56] References Cited

U.S. PATENT DOCUMENTS

| | | | |
|---|---|---|---|
| 3,233,346 | 2/1966 | Cornberg | 434/307 |
| 3,524,949 | 8/1970 | Kleve | 360/92 X |
| 3,654,708 | 4/1972 | Brudner | 434/307 |
| 4,335,809 | 6/1982 | Wain | 273/DIG. 28 |
| 4,477,069 | 10/1984 | Crudgington, Jr. | 273/DIG. 28 |

OTHER PUBLICATIONS

"Coin Operated Instructive Games", Play Meter, Dec. 1980, pp. 113, 114, 116, 119.

Primary Examiner—Robert L. Richardson
Attorney, Agent, or Firm—Marvin H. Kleinberg

[57] ABSTRACT

An audio-visual entertainment device includes an enclosed module which contains a video screen, audio speakers and seating for one or two viewers. Sensors respond to the presence of a viewer to change from an "attract mode" audio visual display to one that invites selection of an entertainment program from an inventory of programs. Upon payment of a "fee", the apparatus selects and displays the desired program. The program inventory is maintained on video disks which can be periodically replaced.

8 Claims, 6 Drawing Figures

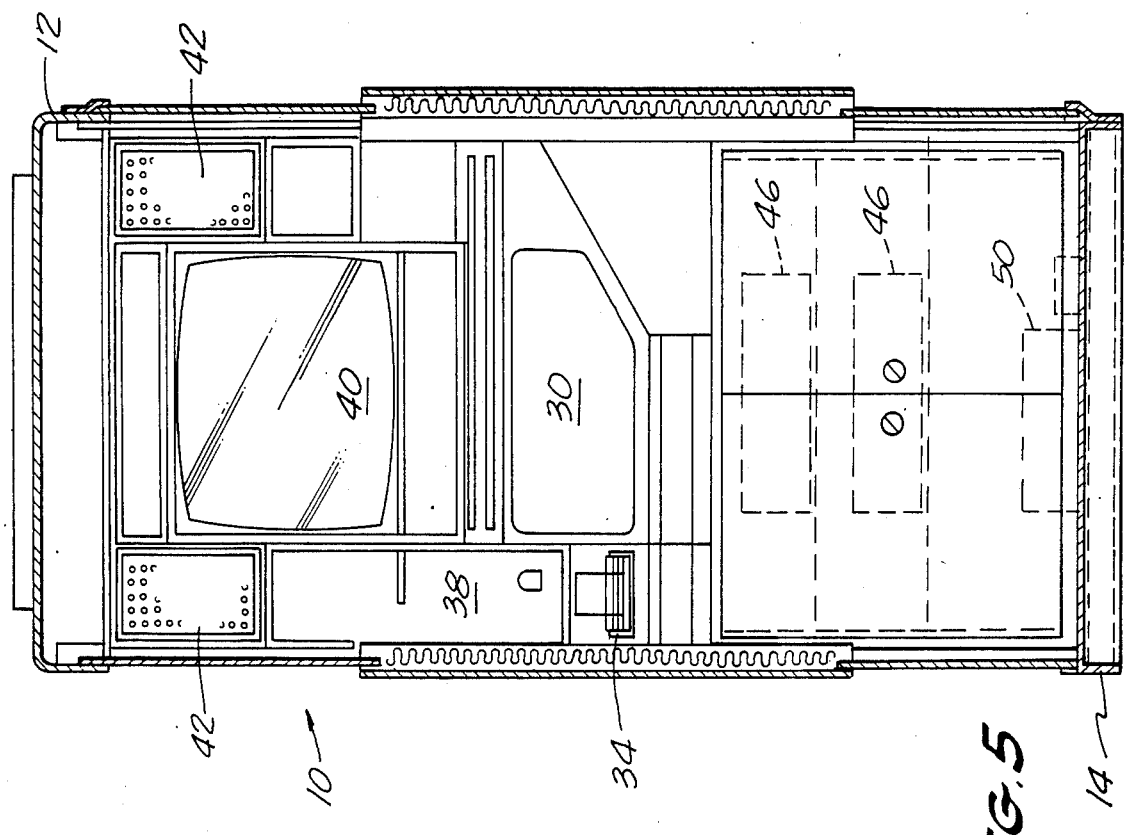
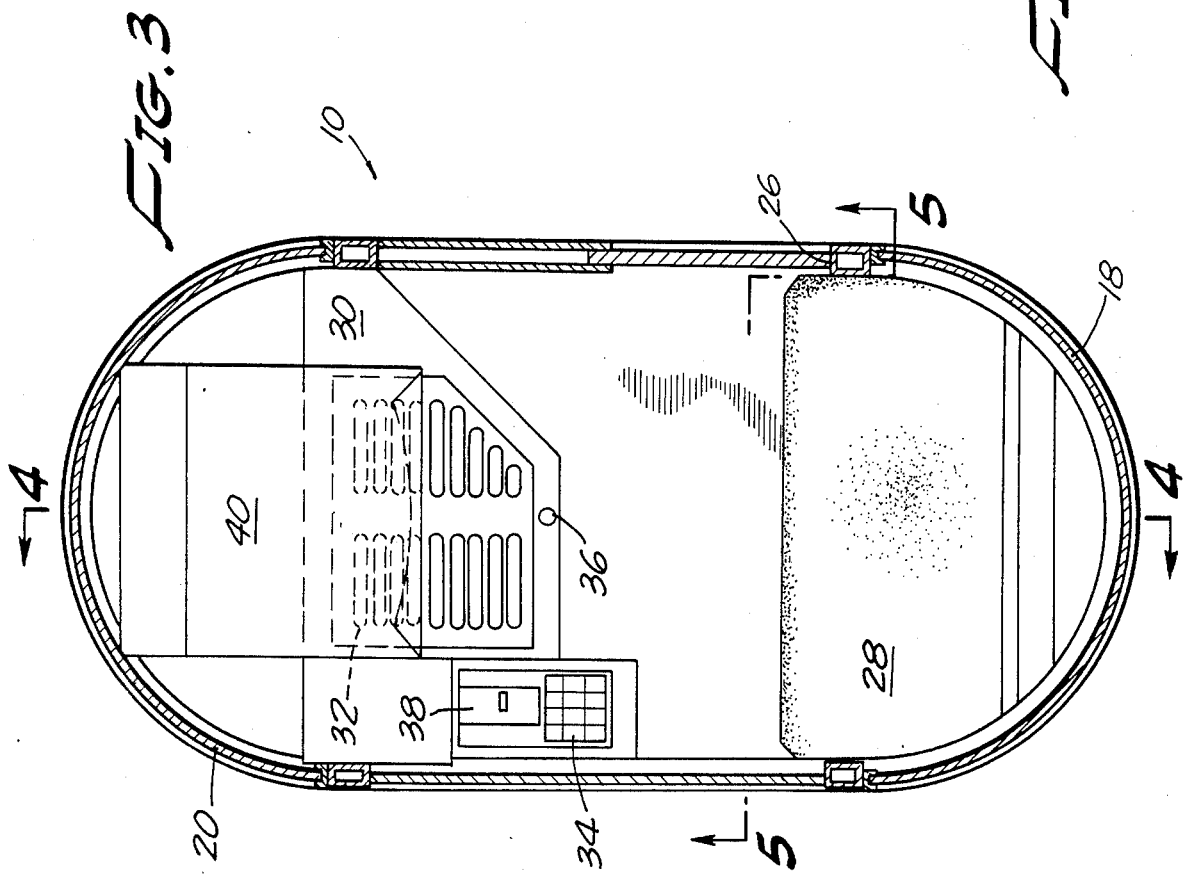

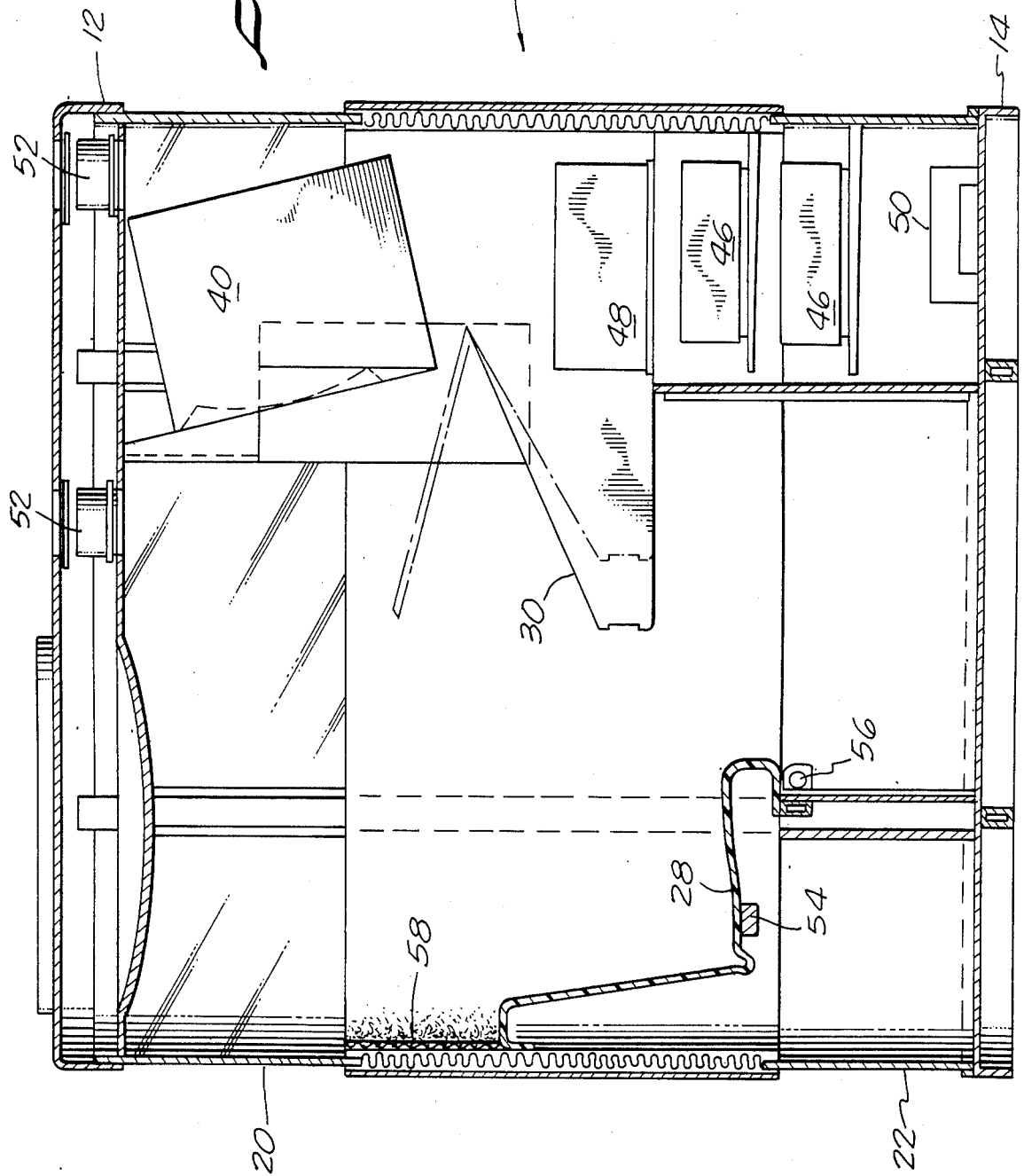

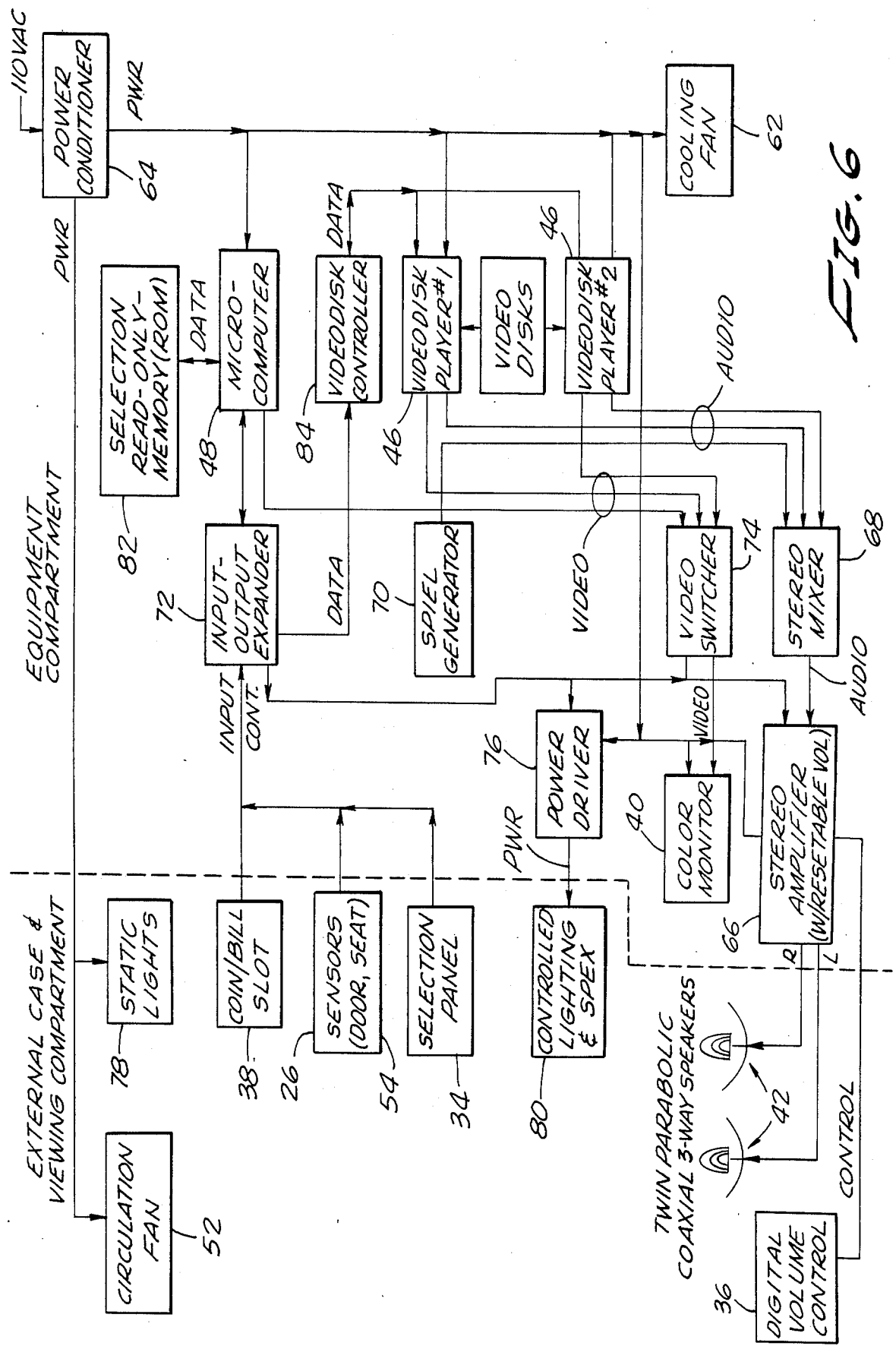

AUDIO VIDEO ENTERTAINMENT MODULE

The present invention relates to entertainment devices and, more particularly, a coin-operated audio video display device in an enclosure that is relatively isolated from ambient light and sound.

INTRODUCTION

Over the years, entertainment devices have been provided for the individual which were energized by the tender of a predetermined payment. These devices have been as varied as the imagination could conceive. Coin operated pianos, music boxes, "bands" and "jukeboxes" have all, through the years, provided entertainment for a price. All have presented the popular songs and melodies for the edification of those who chose to pay the price.

Audio-visual entertainment devices have also been provided that would, for a price, provide a visual display from the manually cranked, peep show machines of the old "penny arcade" to the "soundies" of the 1940's wherein a short musical sound motion picture was projected on a ground glass screen. As technology has advanced, coin operated amusement devices have proliferated. The old "penny arcade" has been replaced by video arcades with a vast assortment of coin operated devices ranging from pin ball machines to sophisticated video games.

PRIOR ART

Amusement devices which are self contained and utilize a visual display of moving images have been described in the early patents to Murie, U.S. Pat. No. 1,005,061, in which several viewers are seated on a platform that is capable of movement in the vertical and lateral directions in synchronism with a visual image that is projected on a viewing screen. It is contemplated that the scenes will be representative of views from an airship or balloon so that the viewers will have the impression of flight or motion in such a vehicle.

More recently, the patent to Trumbull, U.S. Pat. No. 4,066,256, taught a modern version of a similar device to create the illusion of being in a rapidly maneuvering vehicle. Trumbull utilized a motion picture projector and a hydraulically actuated frame which coordinated motion of the viewer to the projected scenes.

A video game apparatus which also included an enclosure with a video screen was described in the patent to Manabe, U.S. Pat. No. 4,478,407. There, the viewer/player had manual controls which affected the images in the video display and which, at the same time, operated the platform to incline the seating platform in response to the movement of the controls, thereby simulating a presence in the scene being viewed.

These prior art patents are primarily directed at an amusement device in an enclosure with a visual program that is enhanced by the motion experienced by the viewer. Other patents described a more passive environment in which to view a limited motion picture. For example, the patent to Foster et al, U.S. Pat. No. 2,833,541, showed a booth which contained the projectors and screen and which permitted a plurality of viewers to watch the program from the outside of the booth.

Home entertainment has also made great strides in technology. Videotapes and videodisks have brought motion pictures and variety shows into the home for viewing on a television set. Broadcast television has also branched into cable with channels devoted to special interests such as music, motion pictures and the so-called "fine arts". Recorded audio entertainment has been expanded to include video presentations to accompany the musical compositions.

Some television stations and some cable channels are now virtually dedicated to musical programming in which the latest "hits" of recording artists are accompanied by visual images. Artists frequently use these audio visual presentations to help in the sale of their record albums and frequently the record companies will produce extensive video programs in conjunction with a new album in an attempt to stimulate sales of the album.

BRIEF SUMMARY OF THE INVENTION

According to the present invention, a personal viewing booth has been created which can offer a viewer a choice of audio visual music selections with the selections being changed from time to time. The booth provides a certain amount of isolation from the ambient environment so that the viewing and listening will not be disturbed by outside light and sound and, on the other hand, the musical presentation within the booth will not unduly impinge on the surrounding environment Because the present invention is intended to operate in response to the payment of money, the apparatus can either utilize a coin mechanism or can be made to respond to tokens which are sold in the vicinity of the viewing booth. Normally, the invention will operate in an "attract" mode in which a prescribed program intended to be viewed by passers by will appear on the visual display. An audio program may also be include as a part of the "invitation". When a viewer decides to avail himself (or herself) of the entertainment program, the booth is entered and a sliding door is closed.

When the viewer is seated within the booth, sensors in the seats and the door signal the presence of the viewer and a second operating mode is entered which instructs the viewer in the proper use of the viewing booth. A set of instructions may audio-visually advise the viewer of the steps required in the operation of the viewing booth. A list of available programs may be posted on the exterior of the booth and will also be found on the inside. The program list may also be displayed on the viewing screen.

A selection mechanism enables the viewer to choose a program to be viewed. When actuated, a video player is energized and the selected program is found and displayed on a suitable monitor. High quality acoustical speakers whose volume can be controlled will present the audio portion of the program. The chosen entertainment segment is then displayed for the viewer. At the conclusion of the presentation, the machine returns to the second operating mode during which the viewer can select and pay for a second presentation or the viewer can exit the booth, in which case the presence sensors activate the "attract" mode of operation.

In alternative embodiments, a sliding door can be replaced with a curtain or drape which can also provide a limited amount of light and sound isolation. Further, although the preferred embodiment employs one or more video disk players, alternative embodiments could use video cassette recorders. It is also possible, in alternative embodiments, to utilize speakers that are mounted in the seating portion and are positioned adjacent the ears of the viewer to enhance the stereophonic effects of the recorded sound.

BRIEF DESCRIPTION OF DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

FIG. 3 is a sectional view of the audio video display device of FIG. 2, taken along the line 3—3 in the direction of the appended arrows;

FIG. 4 is a side sectional view of the audio video display device of FIG. 3, taken along the line 4—4 in the direction of the appended arrows;

FIG. 5 is a sectional view of the audio video display device of FIG. 3, taken along the line 5—5 in the direction of the appended arrows; and FIG. 6 is a functional block diagram of the operating components of the audio video display device according to the present invention.

DETAILED DESCRIPTION OF DRAWINGS

Figure 1:
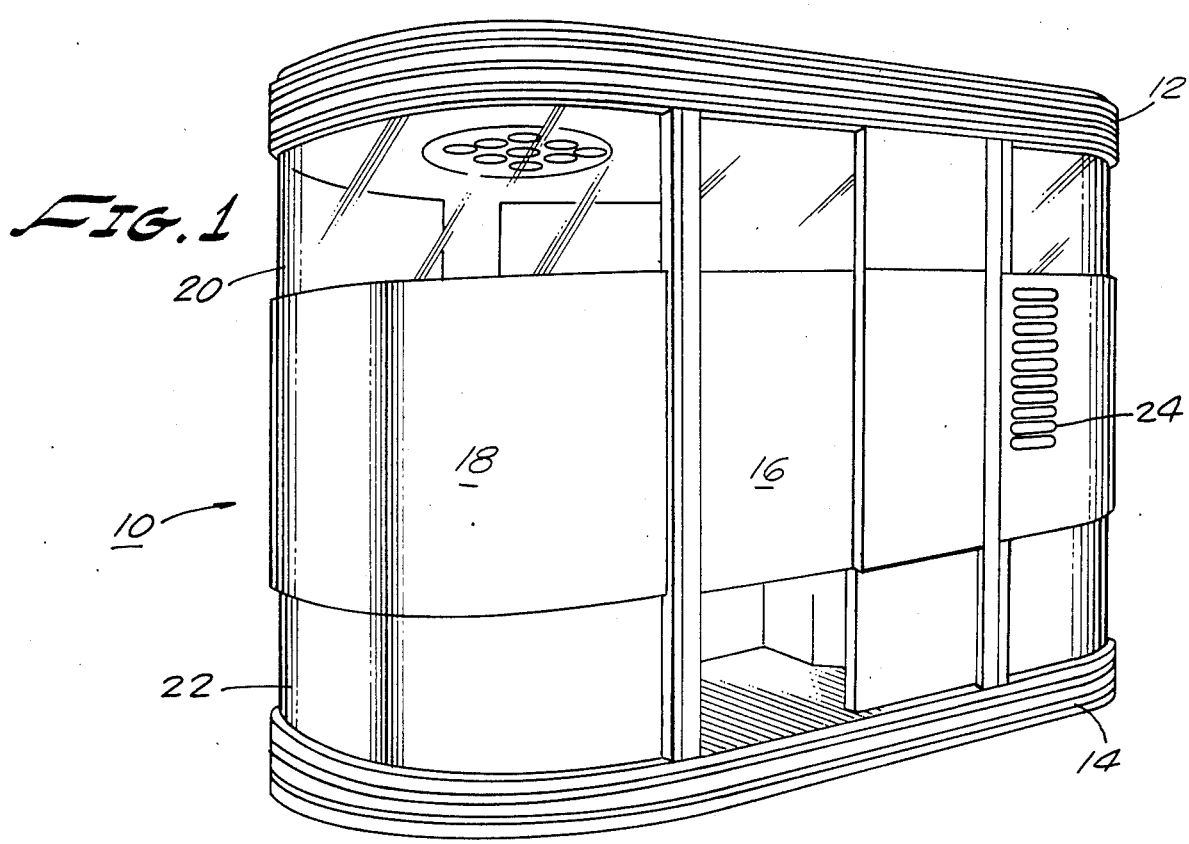
FIG. 1 is a perspective view of an audio video display device according to the present invention.
Figure 2:
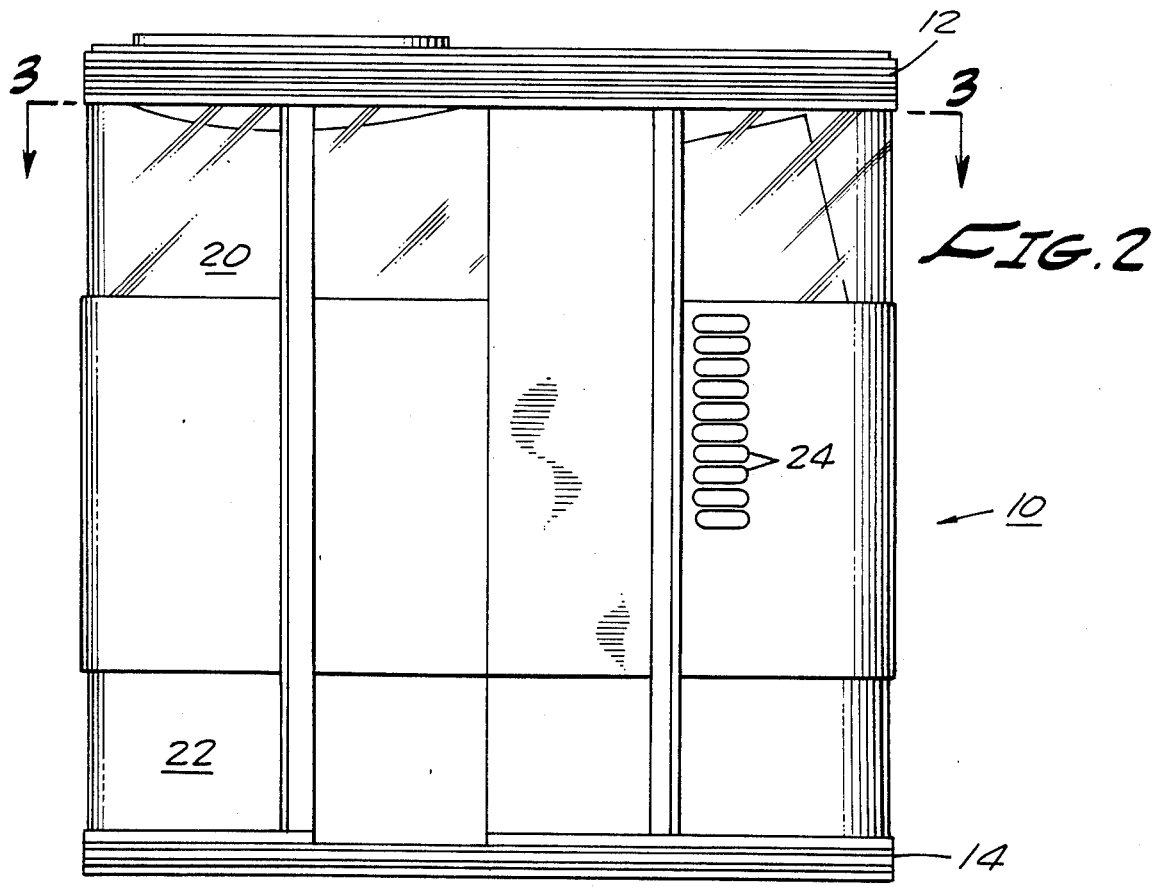
FIG. 2 is an exterior side view of the audio video display device of FIG. 1.

Turning first to FIG. 1, there is shown, in perspective view, a preferred embodiment of the audio video display booth 10 of the present invention. A decorative peripheral upper panel 12 and a similar, decorative peripheral bottom panel 14 are supplied with illuminating elements 16. An entry is formed in the side of the booth 10 that is defined by a sliding door panel 16 which, when opened, is retained in a pocket of a central peripheral wall panel 18. A transparent plastic wall portion 20 is placed between the upper panel 12 and the central panel 18 and a second transparent wall portion 22 is placed between the central panel 20 and the bottom panel 14.

On the wall panel 18 adjacent the door panel 16 is placed a graphic display 24 which can include an attractive presentation of the subjects that are available for viewing. The transparent upper wall portion 20 and lower wall portion 22 provide some sound isolation from the surrounding environment while permitting some exterior illumination. More important, the transparent panels afford some measure of spaciousness to the occupants of the booth 10 and, to a certain extent, can avoid a potential for claustrophobia for the occupants.

With reference now to FIGS. 3, 4, and 5, the interior layout of the booth 10 can be described. The door panel 16 moves from a recess in the right hand part of the booth 10 as seen from FIG. 3. A door sensor 26 is provided to signal when the door is in the closed position. In the preferred embodiment, a bench type, double seat 28 is provided, although in alternative embodiments, separated seats or individually contoured seats may be employed.

A control panel 30 is positioned to be easily accessible to a seated viewer. The control panel 30 includes a display 32 of available selections and a key pad 34 enables the choice of one or more of them. A separate volume control 36 enables the regulation of the volume of the audio portion of the presentation. A coin or currency device 38 collects the appropriate charge for the play of one or more of the selections.

A video monitor 40 displays the picture portion of the program and a pair of high fidelity, parabolic speakers 42 all face the viewer to give a stereophonic effect to the audio portion of the program. The view available to an occupant of booth 10 is best seen in FIG. 5.

Concealed behind access doors 44 are the operating components of the audio visual display system of the present invention. As presently envisaged, the system would employ a pair of video disk players 46, a microcomputer 48 with peripherals to control all of the operating functions of the system, a stereophonic audio amplifier and power conditioning power supply 50 to drive all of the components comprising the system.

The control panel 32 is hinged for access to the microcomputer 48 and to the various system elements carried by the control panel 32. This simplifies maintenance for the graphic display 24 and coin collector 38.

Other elements of the system that are best seen in FIG. 4 are the circulation fans 52. Although two fans are shown in the preferred embodiment, depending upon the ambient environment of the booth 10, and the heat generated by the components contained within the booth 10, one fan 52 may run continuously while another would be activated only when there are occupants in the booth 10.

A seat sensor 54 can signal the microprocessor that the booth 10 is occupied and can, either alone or in conjunction with the door sensor 26, change the operation of the system from an "attract" operating mode to an "entertain" mode. If the entertain mode includes a dimming of the interior lighting, a courtesy light strip 56 can be illuminated for safety.

As is illustrated in FIG. 4, a sound insulating material is provided in the wall panel 18 to provide some isolation from the ambient noise and to protect the surrounding environment from the excesses of an occupant of the booth 10. Additionally, a sound deadening material, such as carpeting 58, may help to further insulate both the interior from extraneous ambient noise and the exterior from the audio portion of the selected program.

In order to understand the operation of the audio visual display system, the various electronic system components must be identified and their interrelationship explained. That is best accomplished with reference to FIG. 6, which is a block diagram of the component elements of the system, interconnected together. Included in the booth 10 are lighting elements 60 which are normally bright to provide a constant level of illumination whenever the power is applied to the system.

The circulation fans 52 are used to provide a comfortable environment within the booth 10. However, because of the heat that is generated by the electronic components that are stored behind the access doors 44, an additional fan 62 is supplied. The amplifier and power conditioner 50 includes a power conditioner element 64, a stereophonic amplifier element 66 and a stereophonic mixer 68. The mixer 68 receives its inputs from the audio channels of the video disk players 46 and from a so-called spiel generator 70.

The spiel generator is used to produce instructional messages which can be played over the speakers to enable users to operate the various systems. The "spiel" can explain the operation of the various controls and can teach a user how to view a desired program.

The microcomputer 48 applies certain signals and receives other input signals from an input-output expander 72 which applies control signals from the microcomputer 48 to various elements of the system. The input-output expander 72 receives signals from the coin collector 38, the door sensor 26, the seat sensor 54 and the key pad 34. Output control signals are applied to the spiel generator 70, the stereo amplifier 66, a video switcher 74 and to a power driver 76, which is energized by the amplifier and power conditioner 50.

The power conditioner 50 also powers the video monitor 40, the video disk players 46, the microcomputer 48, the circulation fans 52, the cooling fan 62, the stereo mixer 68 the video switcher 74 and a static lighting system 78. The power driver 76 is coupled to furnish power to a special effects and lighting system 80.

A selection memory 82 stores information pertaining to the performances contained on the video disks that have been placed in the video disk players 46. The selection memory 82 can be a read only memory device (ROM) which is changed or replaced each time the video disks are replaced. However, the selection memory 82 can also be alterable if it is desired to store counts of the selections that are played or other information such as the frequency of use, the time of day that the system is in use and the time of day that each program is played for analysis and future programming.

A video disk controller 84 receives data from the input-output expander 72 and supplies informational data to the video disk players 46. This informational data directs the operation of the player 46 containing the appropriate selection and directs that player to access the chosen program.

In operation, and with reference to the Figures, the booth 10 in its quiescent condition has power applied to its various electronic and electromechanical systems. The the static lighting system 78 is energized and the lighting 60 is illuminated. The "attract mode" is operating and various special lighting effects are displayed to direct attention to the booth 10. The circulation fans 52 are operating as is the cooling fan 62.

Since, in the preferred embodiment, the upper portion of the booth 10 is enclosed by a transparent upper panel 12, the video monitor 40 can be activated and a video display generated by the microcomputer 48 is presented. Alternatively, the video display can be left off until a viewer enters the booth 10.

The booth 10 is intended to accommodate one or two viewers. The door panel 16 slides open to admit the viewers and when the door panel 16 is slid closed, the door sensor 26 signals their presence. When the viewers are seated, the seat sensor 54 sends a signal to the input-output expander 72 which applies the signal to the microcomputer 48. A planned sequence of activities is then commenced and signals are sent through the input-output expander 72 to power driver 76 which, in turn, energizes the video monitor 40, the stereo amplifier 66 and the special effects and lighting system 80. The level of the interior lighting is changed and the monitor displays an instructional program as does the spiel generator 70 which produces an audio program that can explain the next operational steps.

Following the instructions thus provided, the viewer is presented with a choice of selections. Utilizing the coin collector 38 which also may be provided with a bill receiving mechanism for handling paper currency, the viewer energizes the selection mechanism which begins with the key pad 34. By actuating the proper keys in a directed sequence, the various program selections are made and the microcomputer 48 is provided with the necessary information to proceed.

The appropriate one of the video disk players 46 which contains the initial selection is energized. The video output is applied through the video switcher 74 to the video monitor 40 and the audio portion of the program is applied through the stereo mixer 68 to the stereo amplifier 66 and then to the speakers 42. By manipulating the volume control 36, the viewer can adjust the audio level of the stereo amplifier 66.

If a plurality of selections have been made and paid for, the program continues, switching between the video disk players 46 as required until all of the desired program has been viewed and heard. At the conclusion of the program, the microcomputer 48 may generate a signal to the lighting system to return to the attract mode and raise the interior illumination level, effectively ignoring the signals of the seat and door sensors 54, 26. The opening of the door panel 16 and the departure of the viewers causes the door sensor 26 and seat sensor 54 to signal the availability of the booth 10 for a subsequent viewer and can "reset" the system in readiness.

The sequence just described is illustrative only and should not be deemed an exhaustive or complete one. The individual elements of the system can be more or less complex and the system can operate in a variety of ways limited only by the imagination of the assembler. For example, a plurality of key/switches can be provided, one for each available program selection. Alternatively, a 10-key pad might be utilized and the video monitor 40 could direct the appropriate key actuations for a desired program.

The door panel 16 can either be a relatively narrow sliding panel or can be wider, if desired. Alternatively, the door panel 16 can be replaced by a curtain or other device which can provide limited isolation to the occupants of the booth 10. Accordingly, the scope of the invention should be limited only by the breadth of the claims appended hereto.

What is claimed as new is:

1. An entertainment module for presenting prerecorded visual and audible entertainment comprising in combination:
   a. a viewing chamber adapted to substantially surround occupants for providing substantial acoustic and light isolation from the surrounding environment to enhance the presentation of visual and audible entertainment;
   b. seating means within said viewing chamber for accommodating a limited number of viewers of the entertainment to be provided;
   c. image presenting means within said viewing chamber for displaying visual images to occupants of said seating means;
   d. acoustical transducing means within said viewing chamber for providing audible entertainment to occupants of said seating means;
   e. coin operated selection means within said viewing chamber for enabling the occupants of said seating means to choose one of a predetermined inventory of pre-recorded entertainment programs;
   f. audio-visual display generating means within said viewing chamber coupled to said coin operated selection means and operable in response thereto for providing visual images to said image presenting means and audible entertainment to said acoustical transducing means;

whereby an occupant of said seating means within said viewing chamber can select a pre-recorded program from an inventory of programs and by inserting one or more coins into said selection means, can cause a selected program to be visually and audibly presented in an environment that is relatively free from the ambient light and sound existing at the exterior of said viewing chamber.

2. The apparatus of claim 1 wherein said image presenting means include a video monitor.

3. The apparatus of claim 1 wherein said acoustical transducing means include speakers mounted in said seating means.

4. The apparatus of claim 1 wherein said audio-visual display generating means include a video disk player.

5. The apparatus of claim 1 wherein said audio-visual display generating means include disk selecting means for accessing one of a number of pre-programmed video disks.

6. An entertainment module for presenting prerecorded visual and audible entertainment comprising in combination:
   a. a viewing chamber providing substantial acoustic and light isolation from the surrounding environment to enhance the presentation of visual and audible entertainment;
   b. seating means for accommodating a limited number of viewers of the entertainment to be provided;
   c. image presenting means for displaying visual images to occupants of said seating means;
   d. acoustical transducing means for providing audible entertainment to occupants of said seating means;
   e. coin operated selection means for enabling the occupants of said seating means to choose one of a predetermined inventory of pre-recorded entertainment programs;
   f. audio-visual display generating means coupled to said coin operated selection means and operable in response thereto for providing visual images to said image presenting means and audible entertainment to said acoustical transducing means;
   g. interior illuminating means in said viewing chamber;
   h. sensor means installed in said seating means for signalling the presence of a viewer; and
   i. light switching means coupled to said interior illuminating means and said sensor means for changing the intensity of the interior illumination in response to the presence of a viewer, whereby an occupant of said seating means can select a pre-recorded program from an inventory of programs and by inserting one or more coins into said selection means, can cause a selected program to be visually and audibly presented in an environment that is relatively free from the ambient light and sound existing at the exterior of said viewing chamber and whereby said viewing chamber is normally maintained at one level of illumination in the absence of viewers and at a different level of illumination in the presence of viewers.

7. An entertainment module for presenting prerecorded visual and audible entertainment comprising in combination:
   a. a viewing chamber providing substantial acoustic and light isolation from the surrounding environment to enhance the presentation of visual and audible entertainment;
   b. seating means for accommodating a limited number of viewers of the entertainment to be provided;
   c. image presenting means for displaying visual images to occupants of said seating means;
   d. acoustical transducing means for providing audible entertainment to occupants of said seating means;
   e. coin operated selection means for enabling the occupants of said seating means to choose one of a predetermined inventory of pre-recorded entertainment programs;
   f. audio-visual display generating means coupled to said coin operated selection means and operable in response thereto for providing visual images to said image presenting means and audible entertainment to said acoustical transducing means;
   g. sensor means installed in said seating means for signalling the presence of a viewer;
   h. invitational program means for normally displaying a repeating audio visual invitational display on said image presenting means and said acoustical transducing means; and
   i. program switching means operable in response to said sensor means for switching to a menu program from said invitational display in response to the presence of viewers in said seating means, whereby an occupant of said seating means can select a pre-recorded program from an inventory of programs and by inserting one or more coins into said selection means, can cause a selected program to be visually and audibly presented in an environment that is relatively free from the ambient light and sound existing at the exterior of said viewing chamber.

8. The apparatus of claim 1 wherein said acoustical transducing means include a pair of parabolic speakers positioned on opposite sides of said image presenting means.

* * * * *